UNITED STATES PATENT OFFICE.

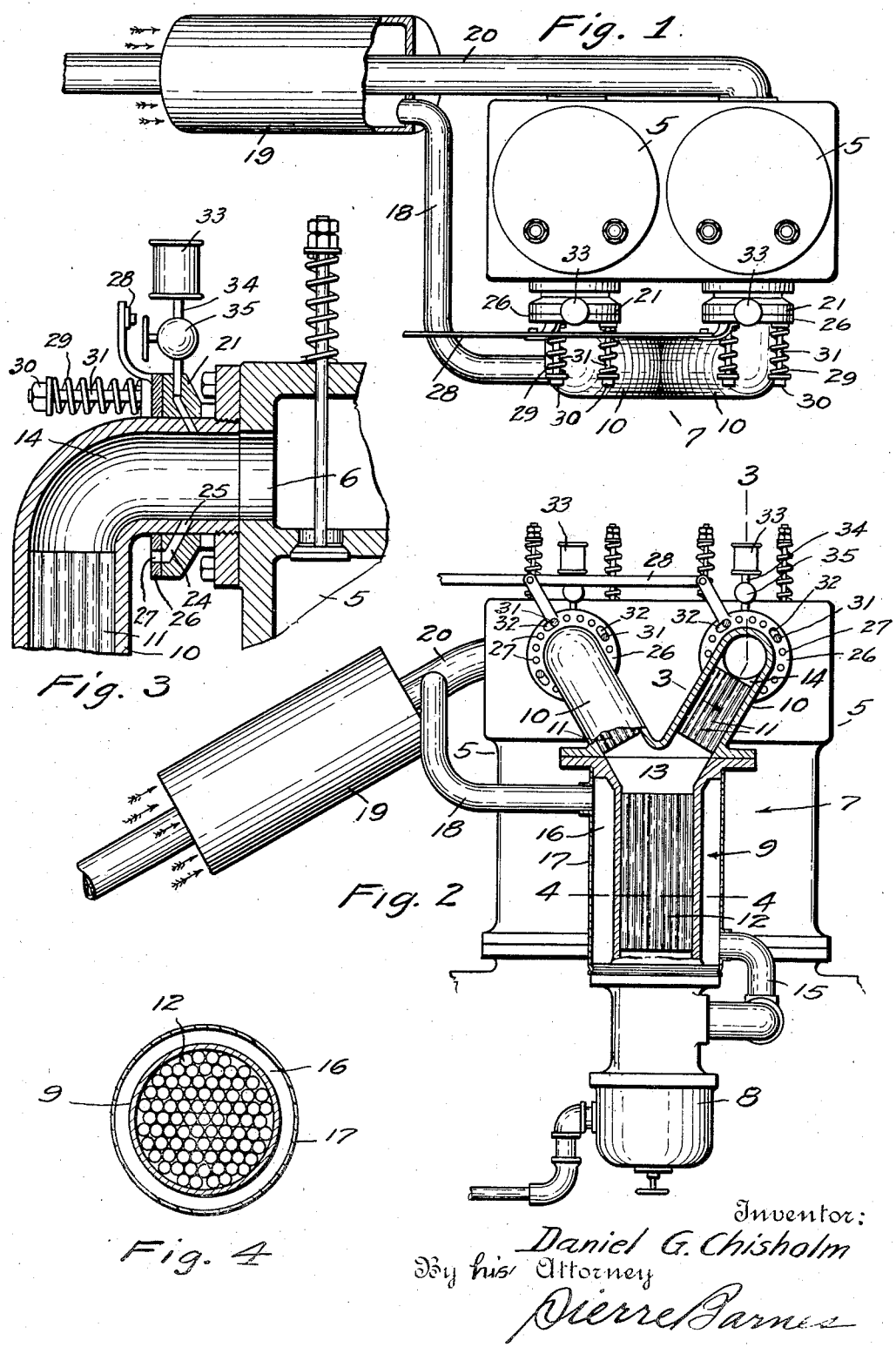

DANIEL G. CHISHOLM, OF SEATTLE, WASHINGTON.

HEATING DEVICE FOR INTERNAL-COMBUSTION ENGINES.

1,374,280.  Specification of Letters Patent.  Patented Apr. 12, 1921.

Application filed June 24, 1920. Serial No. 391,408.

*To all whom it may concern:*

Be it known that I, DANIEL G. CHISHOLM, a citizen of the United States, residing at Seattle, in the county of King and State of Washington, have invented certain new and useful Improvements in Heating Devices for Internal-Combustion Engines, of which the following is a specification.

This invention relates to internal combustion engines; and its object is the provision of devices whereby liquid fuels such as gasolene, kerosene or distillate, may be volatilized and the gaseous products therefrom mixed with air to afford a better explosive mixture than hitherto.

The invention consists in the novel construction, arrangement and combination of parts as will be hereinafter described and claimed.

In the accompanying drawings, Figure 1 is a plan view of an engine with my invention applied thereto. Fig. 2 is a side elevational view of the same, with the intake manifold shown partly in vertical section. Figs. 3 and 4 are detail sectional views through 3—3 and 4—4 of Fig. 2.

In said drawings, the numerals 5 represent the cylinders of an explosion engine having inlets such as 6, Fig. 3, through which communication is had by means of a manifold, indicated generally by 7, with a carbureter 8 of any usual or suitable type.

In the present invention said manifold comprises a lower main section 9 and an upper section having two branch members 10 which extend to the respective cylinder inlets 6. Within each branch 10 is a group of small tubes 11 and a similar group of tubes 12 is provided in the lower section 9. Said tubes are arranged in the manifold in such relations so as to afford between the tubes 11 and 12 a space 13 unprovided with tubes and similar spaces as at 14 between the respective tubes and the outlets of the branches 10. The carbureter 8 is supplied with air by a pipe 15 leading from the lower end of an annular chamber 16 provided by a casing 17 surrounding the main section 9 of the manifold. The upper end of the chamber 16 is connected by a pipe 18 with an end of an air heating drum 19 surrounding the engine exhaust pipe 20. Rigidly mounted upon the manifold branches 10 in proximity of their outlet extremities are collars 21 having holes 24 communicating with holes as 25 Fig. 3, in the respective branches for the admission of secondary air into the latter. The associated holes 24—25 have their delivery ends disposed obliquely to the axis of and directed toward the respective branch outlet.

The holes 24 of the collars are regulated as to their effective sizes by means of damper plates 26 having ports 27 which may be brought into register with or close the holes 24, more or less, according to the quantity of secondary air which is desired to be supplied into the manifold. Said damper plates are connected for unitary rotary movements by an operating rod 28.

The damper plates, as shown, are rotatable upon the manifold branches 10 and are held in juxtaposition with the collars 21 by means of springs 29 interposed between the damper plates and adjustment nuts 30 provided on bolts 31 which pass through slots 32 of the damper plates and engage in the respective collars.

33 represents cups or receptacles for water which is supplied through pipes 34 into the chambers 14 in small quantities as regulated by valves 35.

In operation, air admitted as indicated by arrows (Figs. 1 and 2) into an end of the drum is heated in its passage through the latter by heat radiated from the exhaust pipe 20 and is conducted from the other end of the drum through pipes 18, casing 17 and pipe 15 to the air inlet of the carbureter 8. The hot air in thus passing through the casing 17 serves to heat the manifold member 9.

The hot air in passing through the carbureter facilitates the volatilizing of the liquid fuel and accompanies the latter through the manifold into the explosion chambers of the engine. The hot air and fuel mixture renders the tubes 12 and 11 quite hot so that the mixture in passing in a plurality of small streams through the successive groups of tubes is more uniformly heated than otherwise.

By alternating the tubes with spaces 13 and 14 the gas and air body, so to speak, is alternately broken up and reunited to further facilitate the mixing of primary air with volatilized liquid fuel.

Until the resulting mixture reaches the space 14 it is subjected to a high temperature thereby affording an exceedingly good mixture.

When such mixture is attained it is advantageous to lower the temperature of the same for the purpose of increasing its efficiency and to economize consumption.

To such end relatively cool secondary air is drawn in a number of small jets through holes 24 and 25 into spaces 14 in directions inclined to the axes of the currents of hot gases passing from the manifold into the valve chambers of the engine.

The construction and operation of the invention, it is thought, will be understood from the foregoing description.

What I claim is:

1. In an internal combustion engine, the combination with the engine body, an intake manifold, an exhaust pipe and a carbureter connected to said manifold, of an air heating drum surrounding said exhaust pipe, an air heating casing surrounding said manifold, pipe connections between said drum and the casing and also between the latter and the air intake opening of the carbureter, groups of tubes provided within said manifold, said groups being disposed in spaced relations with each other, said manifold being provided adjacent to its outlet ends with air inlet openings, and means for regulating the effective sizes of said inlet openings.

2. In an internal combustion engine the combination with the engine body, an intake manifold, an exhaust pipe, an air drum provided on said pipe, an intake manifold provided adjacent to its connection with the body with air inlet holes, a carbureter connected to the inlet end of the intake manifold, and means for conducting air heated by said pipe in the drum to said carbureter, of means provided in spaced relations with each other within the intake manifold whereby the gaseous mixture passing through the latter from the carbureter is caused to be successively divided into pluralities of currents, collars provided upon the intake manifold and having holes in register with the aforesaid manifold holes, and a rotary plate for each of said collars, said plates being provided with ports whereby the plates serve as valves to regulate the admission of air through the associatetd collar and manifold holes.

3. In an internal combustion engine, the combination with the engine body, an intake manifold having a main inlet portion and branch outlet portions connected to the engine body, a carbureter connected to the said main portion of the manifold, and means to supply hot air to said carbureter, of means provided in said manifold to effect the dividing of the gaseous mixture from the carbureter into relatively small streams successively in the main and branch portions of the manifold.

4. In an internal combustion engine, the combination with the engine body, an intake manifold having a main inlet portion and branch outlet portions connected to the engine body, said branch portions being provided with air inlet holes adjacent to the engine body and arranged in oblique relations to the axes of the respective branches at the outlets thereof, a carbureter connected to said main portion of the manifold, and means to supply hot air to said carbureter, of means provided in said manifold to effect the dividing of the gaseous mixture from the carbureter into relatively small streams successively in the main and branch portions of the manifold, and means for regulating the quantity of air admitted into the manifold branches through the inlet holes thereof.

Signed at Seattle, Washington, this 11th day of June, 1920.

DANIEL G. CHISHOLM.

Witnesses:
PIERRE BARNES,
MARGARET G. SUPPLE.